United States Patent Office  
3,728,300  
Patented Apr. 17, 1973

3,728,300
PROCESS FOR PRODUCING POLYMER BLENDS
Saburo Minekawa, Yokohama-shi, Koretaka Yamaguchi, Kawasaki-shi, Kazuo Toyomoto and Einosuke Fujimoto, Yokohama-shi, and Kuniaki Sakamoto, Tokyo, Japan, assignors to Asahi Kasei Kogyo Kabushiki Kaisha, Osaka, Japan
Filed Aug. 9, 1968, Ser. No. 751,545
Claims priority, application Japan, Aug. 26, 1967, 42/54,503
Int. Cl. C08f 19/06, 45/02, 45/28
U.S. Cl. 260—33.6 AQ                     10 Claims

ABSTRACT OF THE DISCLOSURE

Process for producing a uniformly mixed polymer blend of a great utility as a rubber material for producing various rubber products which comprises copolymerising a conjugated diolefin with a monovinyl-substituted aromatic compound to produce a random copolymer of the conjugated diolefin and the monovinyl-substituted aromatic compound having a content of the monovinyl-substituted aromatic compound of 50–95% by weight in the presence of a conjugated diolefin homopolymer or a random copolymer of a diolefin and a monovinyl-substituted aromatic compound having a content of a monovinyl-substituted aromatic compound of not more than 40% by weight, dissolved in an inert medium.

BACKGROUND OF THE INVENTION (1) Field of the invention

This invention relates to a process for blending polymers in the production of synthetic rubbers.

(2) Description of the prior art

We have conducted an extensive study in an attempt to improve the inferior processability and low temperature characteristic appertaining to a styrene-butadiene copolymer rubber having a high styrene content obtained by emulsion polymerization known heretofore, and, as a result, have found that styrene-butadiene copolymer rubbers having a styrene content of 50–95% obtained by solution polymerization in the presence of a lithium-based catalyst affords a rubber composition having superior properties as disclosed in our co-pending U.S. patent application Ser. No. 683,025, now U.S. Pat. 3,526,606, issued Sept. 1, 1970.

In general, these styrene-butadiene copolymer rubbers having a styrene content of 50–95% by weight obtained by solution polymerization are used by being blended with other general-purpose synthetic rubbers, similarly as those conventional copolymers obtained by emulsion polymerization.

Particularly, when these solution-polymerized styrene-butadiene copolymer rubbers having a specific styrene content referred to above are blended with a polybutadiene rubber, polyisoprene rubber or styrene-butadiene random copolymer rubber having a styrene content of not more than 40% by weight, obtained by solution polymerization, there is brought about an advantage in that not only the superior and desirable properties of both respective components are synergistically manifested but also the drawbacks appertaining to either one of the components are compensated for by the superior properties of the other.

In blending these polymer components, generally, a conventional open-roll or Banbury mixer is employed.

However, when blending the styrene-butadiene copolymer rubber having a high styrene content with other general-purpose synthetic rubbers using the open-roll or Banbury mixer, there has been experienced and inconvenience in that sufficient mixing of these polymer components or these polymer components with other compounding ingredients such as fillers and vulcanizing agents cannot be accomplished easily thus requiring a prolonged time for mixing due to the poor processability of the solution-polymerized styrene-butadiene polymer rubber mentioned above.

Furthermore, because of the fact that the uniform dispersion of the polymer components is achieved only insufficiently, the respective features of the styrene-butadiene polymer rubber having high styrene content and the solution-polymerized synthetic polymer rubber blended therewith are not manifested nor the compensation of inferior properties of either one of the components by the other can be achieved so that the resulting blended rubber composition oftentimes fails to show satisfactory practical performances.

As the method of blending two or more kinds of polymer rubbers other than the mechanical methods using an open-roll or Banbury mixer, there has been known a process in which a polymer blend is obtained by mixing an emulsion-polymerized styrene-butadiene copolymer rubber having a high styrene content and an emulsion-polymerized styrene - butadiene copolymer rubber having a low styrene content, e.g. about 25% by weight, in the form of a latex and removing water therefrom to afford a polymer blend.

Although the blending of polymers by way of mixing respective components in the form of a latex affords rubber compositions having superior performances as compared with the mechanical method of blending, the resulting polymer blend is still not necessarily uniform with regard to its micro-structure but is a mixture of finely divided rubbery particles so that such a polymer blend is far from a rubber composition in which respective features of the material rubbers used are fully manifested in its practical performance.

SUMMARY OF THE INVENTION

An object of this invention resides in the provision of a process for producing a polymer blend in which a copolymer rubber of a conjugated diolefin and a monovinyl-substituted aromatic compound having a high content of the monovinyl-substituted aromatic compound is dispersed uniformly.

Another object of this invention resides in the provision of a process for producing a polymer blend having excellent practical performances and processability in which a copolymer rubber of a conjugated diolefin and a monovinyl-substituted aromatic compound having a high content of the monovinyl aromatic compound is dispersed uniformly, which may be practised easily and economically on a commercial scale.

Still another object of this invention resides in the provision of a novel technique which enables the production of a polymer blend in which a copolymer rubber of a conjugated diolefin and a monovinyl-substituted aromatic compound having a high content of the monovinyl-substituted aromatic compound is dispersed uniformly in an aliphatic hydrocarbon solvent.

These objects of this invention mentioned above are accomplished by producing a polymer blend comprising (A) 25–95% by weight of a conjugated diolefin homopolymer or a random copolymer of a conjugated diolefin and a monovinyl-aromatic compound having a content of the monovinyl-aromatic compound of not more than 40% by weight, and (B) 75–5 parts by weight of a random copolymer of a conjugated diolefin and a monovinyl-substituted aromatic compound having a content of the monovinyl-substituted aromatic compound of 50–95% by weight, said random copolymer having a content of the monovinyl-aromatic compound of 50–95% by weight being obtained by copolymerizing the conjugated diolefin and the monovinyl-substituted aromatic compound in the presence of said conjugated diolefin homopolymer or random copolymer of a conjugated diolefin and a monovinyl-substituted aromatic compound having a content of the monovinyl-substituted aromatic compound of not more than 40% by weight, dissolved in an inert medium.

For brevity's sake, the random copolymer of a conjugated diolefin and a monovinyl-substituted aromatic compound having a content of the monovinyl-substituted aromatic compound of not more than 40% by weight may be referred to simply as "CD–MVA 40 copolymer" hereinafter, and the random copolymer of a conjugated diolefin and a monovinyl-substituted aromatic compound having a content of the monovinyl-substituted aromatic compound of 50–95% by weight may be referred to simply as "CD–MVA 5095 copolymer" hereinafter.

Solvents which may be suitably used in the process of this invention include volatile inert hydrocarbons, e.g. aromatic hydrocarbons such as benzene, toluene and xylene; aliphatic hydrocarbons such as pentane, hexane and heptane; cyclic saturated hydrocarbons such as cyclopentane and cyclohexane; and mixtures of two or more kinds of these. Particularly, the use of aliphatic hydrocarbons such as pentane and hexane is preferable in the process of this invention.

In general, when attempting to obtain the CD–MVA 5095 copolymer in aliphatic hydrocarbons solvents, the resulting copolymer is readily precipitated and deposited on walls of the polymerization reactor giving rise to difficulties in the transportation and handling from the operational standpoint. In addition, the conversion of monomers is normally quite low, since these aliphatic hydrocarbons are scarcely capable of dissolving the CD–MVA 5095 copolymer therein.

Hence, as a result, not only the resulting CD–MVA 5095 copolymer may not be isolated from the reaction mixture easily and efficiently but also the resulting copolymer may not be blended with other solution polymerized polymers or copolymers.

In contradistinction, no such undesirable precipitation of the CD–MVA 5095 copolymer takes place in the process of this invention because of the presence of a conjugated diolefin polymer or CD–MVA 40 copolymer which has a good compatibility with the CD–MVA 5095 copolymer in the reaction medium in the process of this invention and further because of the addition of a part of active molecules of the CD–MVA 5095 copolymer to the molecules of conjugated diolefin polymer or CD–MVA 40 copolymer being present.

Hence, it is possible to obtain a starting rubber used for producing a uniform rubber composition having great utilities, even when the resulting polymer blend has a remarkably high content of the CD–MVA 5095 copolymer.

The conjugated diolefin polymers and the CD–MVA 40 copolymers which may be used in the process of this invention include, for example, a polybutadiene rubber having relatively low cis 1,4-linkage, a high-cis polyisoprene rubber and a styrene-butadiene random copolymer having a styrene content of not more than 40% by weight obtained by solution polymerization using a lithium based catalyst, and a high-cis polybutadiene rubber and a high-cis polyisoprene rubber obtained by using a so-called Ziegler-type catalyst, e.g. a combination catalyst of an organoaluminum compound and a titanium trichloride or titanium tetrachloride.

In copolymerizing a conjugated diolefin and a monovinyl-substituted aromatic compound in the presence of a conjugated diolefin polymer or CD–MVA 40 copolymer in the process of this invention, although lithium based catalysts are most preferably used as the polymerization catalysts, any other catalysts capable of copolymerizing a conjugated diolefin and a monovinyl-substituted aromatic compound may be conveniently employed.

In general, the lithium based catalysts is one of a few practical catalysts capable of copolymerizing a conjugated diolefin and a monovinyl-substituted aromatic compound in a solution.

In polymerizing a mixture of a conjugated diolefin and a monovinyl-substituted aromatic compound using a lithium based catalyst alone employing no other additive, the conjugated diolefin is first polymerized, then, to the resulting conjugated diolefin polymer block is added blockwise the monovinyl-substituted aromatic compound to afford a block copolymer of the conjugated diolefin and the monovinyl-substituted aromatic compound. The reason is that the reaction velocity of the conjugated diolefin is much greater than that of the monovinyl-substituted aromatic compound.

Hence, in an embodiment of the process for obtaining a random copolymer of a conjugated diolefin and a monovinyl-substituted aromatic compound, it is necessary that a monomer mixture containing a higher content of the monovinyl-substituted aromatic compound than that contemplated in the resulting copolymer be copolymerized using a lithium catalyst at first.

Alternatively, a random copolymer having a desired content of a monovinyl-substituted compound may be obtained by carrying out the copolymerization using an organoalkali metal compound other than lithium of the general formula, wherein R represents an aliphatic or aromatic group, Y represents oxygen or sulfur, $n$ is an integer of 1–4 and M represents an alkali metal other than lithium, together with a lithium based catalyst as disclosed in British patent specification No. 1,029,445, or, using a ketyl compound of an alkali metal other than lithium, e.g. potassium acetone, as an additive.

Furthermore, the use of polar group-containing additives such as tetrahydrofuran, and hexamethyl phosphoramide, increases the reaction velocity of a monovinyl-substituted aromatic compound in a greater rate than that of a conjugated diolefin is increased. Thus, by the presence of these polar group-containing additives in the polymerization system in a suitable amount, there is obtained a random copolymer of a conjugated diolefin and a monovinyl-substituted aromatic compound.

These processes described above are given merely by way of examples so that the process of this invention may not be restricted by the aforementioned processes and apparently other processes of free choice may be conveniently adopted in practising the process of this invention.

The process of this invention may be explained more fully in the following:

When a solution of a conjugated diolefin polymer is obtained by polymerizing a conjugated diolefin in a solution using a lithium based catalyst, the polymer blend of this invention may be produced by adding to the resulting conjugated diolefin polymer solution a monomeric mixture of a conjugated diolefin and a monovinyl-substituted aromatic compound having a content of the monovinyl-substituted aromatic compound higher than that in the contemplated CD-MVA 5095 copolymer together with a lithium based catalyst to effect a further copolymerization and, then, continuing the copolymerization while replenishing a conjugated diolefin thereto, or, by leaving a part of a conjugated diolefin unreacted when first polymerizing the conjugated diolefin to produce a polymer thereof, copolymerizing the unreacted monomer with a monovinyl-substituted aromatic compound added thereto together with a lithium based catalyst, and further continuing the copolymerization while replenishing a conjugated diolefin thereto.

Alternatively, the polymer blend of this invention may be obtained by polymerizing a conjugated diolefin using a lithium based catalyst, adding to the resulting polymer solution a lithium catalyst, an additive capable of producing a random copolymer exemplified above and a monomeric mixture of a conjugated diolefin and a monovinyl-substituted aromatic compound and subjecting the resulting mixture to a copolymerization reaction.

As a further alternative, the polymer blend of this invention may be obtained by subjecting a monomeric mixture of a conjugated diolefin and a monovinyl-substituted aromatic compound to a copolymerization reaction in the presence of a lithium based catalyst to first produce a polymer substantially comprising the conjugated diolefin, and, then, continuing the polymerization reaction by adding thereto an additive capable of producing a random copolymer exemplified above together with a lithium based catalyst to afford a CD-MVA 5095 copolymer.

The polymer blend of this invention may also be obtained using a CD-MVA 40 copolymer as a starting material in place of a conjugated diolefin polymer by first producing a random copolymer of a conjugated diolefin and a monovinyl-substituted aromatic compound beforehand in the same manner as described hereinbefore and then randomly copolymerizing a conjugated diolefin and a monovinyl-substituted aromatic compound as above in the presence of the first-produced random copolymer.

When catalysts such as Ziegler-type catalysts which are incapable of producing a random copolymer of a conjugated diolefin and a monovinyl-substituted aromatic compound are employed in producing a conjugated diolefin polymer, it is essential that the catalyst used for polymerizing the conjugated diolefin be first and completely deactivated before carrying out the process of this invention, otherwise, a satisfactory polymer blend may not be obtained even if the copolymerization of a conjugated diolefin and a monovinyl-substituted aromatic compound is effected by adding a lithium based catalyst thereto.

Lithium based catalysts which may be used for copolymerizing a conjugated diolefin and a monovinyl-substituted aromatic compound to produce a CD-MVA 5095 copolymer in this invention preferably include metallic lithium; monolithium compounds such as methyllithium, ethyllithium, propyllithium, butyllithium, amyllithium, hexyllithium, 2-ethylhexyllithium, phenyllithium, various tolyllithium and xylyllithium; and dilithium compounds such as pentamethylene dilithium, 1,5-dilithionaphthalene and 1,2-dilithiostilbene.

In the process of this invention, the concentration of the polymer blend obtained in a solution eventually ranges 5–50% by weight and most preferably 10–25% by weight.

If the concentration of the polymer blend deviates from the range set forth above, viz more than 50% by weight or less than 5% by weight, there may not be obtained a uniform polymer blend contemplated in this invention.

In the process of this invention, the copolymerization of a conjugated diolefin and a monovinyl-substituted aromatic compound for producing a CD-MVA 5095 copolymer is carried out at a temperature of 0° C.–150° C., preferably 25–120° C., for a period of from 5 minutes to 25 hours, preferably from 30 minutes to 5 hours.

The polymerization in a solution in the process of this invention is necessarily carried out in an inert atmosphere of nitrogen or argon.

In the process of this invention, the presence of impurities such as oxygen, water, etc., which deactivate the catalyst must strictly be avoided during the polymerization reaction. Hence, when using a conjugated diolefin polymer or a CD-MVA 40 copolymer prepared beforehand by re-dissolving the same into a solvent, it is necessary to remove oxygen or water contained therein as completely as possibly by introducing a nitrogen stream thereinto.

In the polymer blend obtained according to this invention, the amount of CD-MVA 5095 copolymer is essentially 5–75% by weight, preferably 25–60% by weight, based on the total weight of the resulting polymer blend.

The various physical properties of a rubber composition containing less than 5% by weight of the CD-MVA 5095 copolymer are far inferior to those of a rubber composition containing 5–75% by weight of the CD-MVA 5095 copolymer obtained according to this invention.

On the other hand, a polymer blend containing more than 75% by weight of the CD-MVA 5095 copolymer has inferior processability and practical performance.

In the process of this invention, particularly when an aliphatic hydrocarbon such as pentane or hexane is used as a solvent, a high content of the CD-MVA 5095 copolymer exceeding 75% by weight based on the total weight of the resulting polymer blend often leads to precipitation of said copolymer or phase separation in part from a conjugated diolefin polymer or CD-MVA 40 copolymer being present together therewith.

The reason for the restriction on the content of a monovinyl-substituted aromatic compound in the CD-MVA 5095 copolymer contained in the polymer blend obtained according to the process of this invention to the range of 50–95% by weight is that, as described in our co-pending U.S. patent application Ser. No. 683,025, random copolymers having a content of monovinyl-substituted aromatic compound outside the range set forth above are absolutely incapable of affording a polymer blend having excellent processability, performance and well-balanced properties contemplated in this invention.

That is, a vulcanized rubber product obtained from a copolymer of a conjugated diolefin and a monovinyl-substituted aromatic compound having a content of the monovinyl-substituted aromatic compound of less than 50% by weight has inferior practical performances with regard to hardness, abrasion resistance, etc., while a vulcanized rubber product obtained from a copolymer having a content of the monovinyl-substituted aromatic compound of more than 95% by weight has partly deteriorated performances with regard to dynamic property, compression set, low temperature characteristics, etc.

The restriction on the content of monovinyl-substituted aromatic compound in CD-MVA 40 copolymer used in the process of this invention to not more than 40% by weight is based on substantially the same reason as mentioned above. That is, if the content exceeds 40% by weight, a vulcanized rubber product obtained from the resulting polymer blend has partly degraded performances, e.g. with regard to dynamic property, low temperature characteristics and abrasion resistance.

In general, the polymer blend obtained according to this invention essentially has a Mooney viscosity ranging 15–150 as measured by using a Mooney viscometer with a sample which has been preheated at 100° C. in a large-size rotor for one minute and rotated for 4 minutes.

If the polymer blend has a Mooney viscosity lower than 15, a vulcanized rubber product obtained therefrom has performances deteriorated in part, e.g. with regard to the abrasion resistance, while when the Mooney viscosity exceeds 150, not only is the processability such as open-roll tight banding property of the polymer blend degraded but also the performances of the resulting vulcanized rubber products obtained therefrom tend to be deteriorated due to degraded compatibility of the polymer blend with fillers.

In the polymer blend obtained according to the process of this invention, the molecules of CD-MVA 5095 copolymer are being uniformly dispersed and entangled in and with the molecules of a conjugated diolefin polymer or CD-MVA 40 copolymer so that the polymer blend obtained by removing solvent therefrom has an extremely uniform composition and there is afforded a rubber composition having excellent practical performances.

With regard to the reason why the polymer blend having such a uniform composition is obtained by the process of this invention, it is presumed that since the copolymerization of monomers of a conjugated diolefin and a monovinyl-substituted aromatic compound is initiated in a solution of a conjugated diolefin polymer or CD-MVA 40 copolymer, the molecules of CD-MVA 5095 copolymer thus produced are uniformly entangled with and coil round the molecules of the conjugated diolefin polymer or CD-MVA 40 copolymer so that the molecular arrangement in the resulting polymer blend is microstructurally uniform.

It is further presumed that particularly when producing a CD-MVA 5095 copolymer in a solution polymerization using a lithium based catalyst, a part of the active molecules of the resulting CD-MVA 5095 copolymer adds to the molecules of a conjugated diolefin polymer or CD-MVA 40 copolymer being present together therewith so that there is afforded a polymer blend having excellent performances in contrast with a mere physical mixing of these two polymer components in the form of a solution. Hence, the polymer blend obtained in this invention is remarkably uniform as compared with those obtained by physical mixing of polymer components in the form of a solution, not to mention those obtained by mechanical mixing.

More particularly, the polymer blend obtained according to the process of this invention not only has excellent processability such as tight roll banding property, compatibility, roll shrinking property, extrusion property, etc., but also particularly superior abrasion resistance, mechanical properties, dynamic property, compression set, etc., so that the polymer blend of this invention may be successfully and advantageously used for the production of a wide variety of goods including hard shoes-soles, extruded and foamed products.

Moreover, the polymer blend obtained according to this invention has superior low temperature characteristics over conventional polymer blends of the prior art obtained by mixing emulsion-polymerized CD-MVA 40 copolymers with emulsion-polymerized CD-MVA 5095 copolymers in the form of a latex, in addition to those processability and various performances mentioned above. For this reason, the polymer blend of this invention may now be successfully used for the production of various vulcanized rubber products for which conventional polymer blends known heretofore could not be used because of their defected low temperature characteristics.

The polymer blend obtained according to this invention may be used for the production of various useful products either alone or in combination with natural rubbers and/or other synthetic rubbers by incorporating various compounding ingredients thereinto and vulcanizing the resulting compound.

Among the various compounding ingredients conventionally employed, fillers are particularly important with regard to the performance of the vulcanized product.

These fillers may be generally classified into two groups, i.e. ones being mainly used for the purpose of improving the performance, particularly the abrasion resistance and hardness of the vulcanized products, and various carbon black and finely pulverized silicic acid anhydride having different particle diameters and surface structures are included in this category; others are primarily used as extenders or assistants for improving the processability of the vulcanized product, and included in this group are calcium carbonate, calcium silicate, calcium carbonate coated with aliphatic compounds, magnesium carbonate, magnesium oxide, zinc oxide, titanium oxide, clay, alumina and talc.

The amount of a filler used is preferably 10–400 parts by weight per 100 parts by weight of the rubber material used.

Although the amount of the filler used is suitably decided depending upon the use of the contemplated rubber product, an amount of less than 10 parts by weight is generally insufficient from the standpoint of performance of the rubber product, while an amount exceeding 400 parts by weight leads to deterioration in the performance, particularly the abrasion resistance, of the rubber product.

In general, the fillers are mixed mechanically in a Banbury mixer or on an open roll. However, in a particular case, these fillers may be incorporated into the rubber material in the course of the production thereof before removing water or aliphatic or aromatic hydrocarbon solvent and used as a master batch of fillers obtained by removing water or solvent therefrom.

Compounding ingredients of importance, other than the fillers mentioned above, are process oils. In general, the process oils used as a rubber compounding ingredient are classified into paraffinic oils consisting of straight chain saturated hydrocarbons, naphthenic oils consisting of saturated cyclic hydrocarbons and aromatic oils consisting of unsaturated cyclic hydrocarbons, and they are normally categorized in accordance with their "Viscosity Gravity Constant," hereinafter referred to simply as "V.G.C."

In general, the process oils are classified in such a manner that those having a V.G.C. of 0.790–0.849 are paraffinic, those having a V.G.C. ranging 0.850–0.899 are naphthenic and those having a V.G.C. of more than 0.900 are aromatic.

Although any process oils having a V.G.C. within the range of 0.790–1.00 may be used for the polymer blend of this invention, it is preferable that a process oil having a relatively low V.G.C. value be used in a somewhat smaller amount in order to increase the dispersibility and plasticity of the resulting compounded rubber, since such a process oil has a poor compatibility with the polymer blend of this invention.

Conversely, a process oil having a greater V.G.C. value may be used in a larger amount for the purpose of improving the plasticity and dispersibility of the resulting compounded rubber as well as reducing the cost.

The amount of process oil used in the polymer blends of this invention is preferably 2–100 parts by weight, preferably 5–75 parts by weight, per 100 parts by weight of the material rubber. If the amount of process oil is less than 2 parts by weight, the dispersion of the filler and vulcanization accelerator may not be achieved satisfactorily, while an amount exceeding 100 parts by weight leads to deterioration in the physical properties of the resulting vulcanized rubber product.

The process oil which may be used in the polymer blend of this invention can be mixed mechanically in a Banbury mixer or on an open roll together with other additives. Alternatively, the process oil may be used in the form of an oil extended polymer which is obtained by mixing the whole or a part of the process oil to be mixed with the polymer blend of this invention or with other synthetic rubbers such as emulsion-polymerized butadiene/styrene copolymer, solution-polymerized polybutadiene rubber or polyisoprene, to be used in combination therewith, in the form of a latex or a solution in aliphatic or aromatic hydrocarbons, and removing the solvent thereafter to give the oil extended polymer.

In general, in order to obtain a composition containing a large amount of the process oil, it is desirable, from the standpoints of the processing operation and the performance of the resulting product, to incorporate the process oil into the rubber in the form of the oil extended polymer beforehand.

Besides the fillers and process oils mentioned above, there are other compounding ingredients generally used in a rubber composition, e.g., tackifiers derived from rosin or coumarone resin, vulcanization accelerators, vulvanizing agents such as sulfur or peroxides, processing assistants such as stearic acid or metal salts thereof, antioxidants, agents for preventing deterioration by ozone, or waxes. These compounding ingredients are incorporated in suitable amounts depending upon the contemplated use of the product.

A random copolymerization of a conjugated diolefin and a monovinyl-substituted aromatic compound means that a reaction velocity of the conjugated diolefin $K_D$ and that of the monovinyl-substituted aromatic compound $K_A$ are equal.

It is important that the CD-MVA 5095 copolymer obtained in this invention is as random as possible in its structure. For this reason, in the process of this invention, a conjugated diolefin and a monovinyl-substituted aromatic compound are copolymerized in such a manner that the ratio of a reaction velocity of the conjugated diolefin $K_D$ to that of the monovinyl-substituted aromatic compound $K_A$, viz $K_D/K_A$, ranges from 0.2 to 5.

The ratio of $K_D/K_A$ mentioned above may be calculated by measuring the rates of consumption of these monomers being experimentally polymerized, or, by determining the amount of monovinyl-substituted aromatic compound block contained in the resulting polymer blend.

Figure 1:
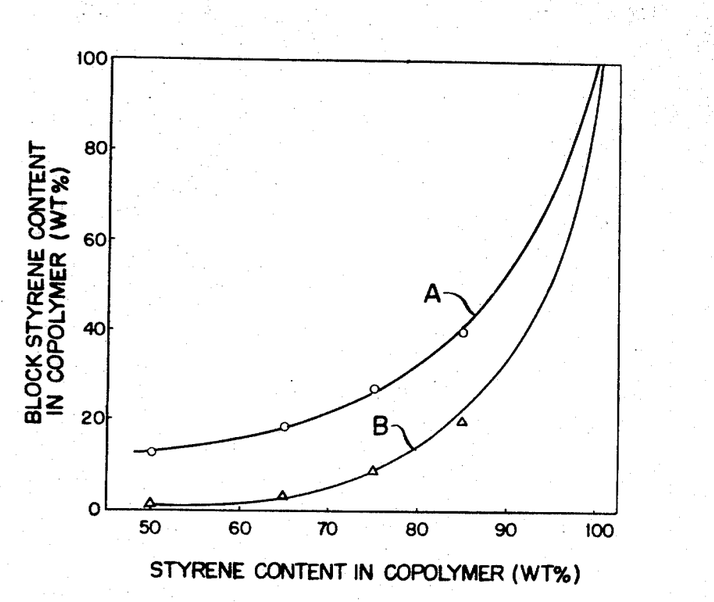
The accompanying drawing illustrates the relationship between a styrene content and a block styrene content in a styrene/butadiene copolymer when copolymerizing styrene with 1,3-butadiene under such conditions that ratios of a reaction velocity of 1,3-butadiene to that of styrene are varied.

For reference as an example, the accompanying drawing diagrammatically illustrates the relationship between the amount of bound styrene and the amount of block styrene in the resulting copolymer based on a statistical calculation when 1,3-butadiene and styrene are copolymerized in toluene under such conditions that the reaction velocities of these respective monomers are equal and that the ratio of $K_D$ to $K_A$ is 5.

In the diagram, the abscissa shows a styrene content in terms of by weight and the ordinate designates a block styrene content by weight both contained in the resulting copolymer.

The block styrene content referred to above is obtained by statistically calculating the weight proportion of styrene high polymers above hexamer being present in the copolymer according to Harwood as described in Polymer Letter, 2, 601 (1964).

In the diagram, the curve A shows the case in which 1,3-butadiene and styrene are copolymerized under such a condition that the ratio of reaction velocity of 1,3-butadiene to that of styrene is 5, and the curve B shows the case where the reaction velocities of these respective monomers are equal.

As can be noted from the diagram, the CD–MVA 40 copolymer used in this invention is a random copolymer containing not more than 5% by weight of monovinyl-substituted aromatic compound in the form of a block.

DESCRIPTION OF THE PREFERRED EMBODIMENTS

This invention will be explained more fully in the following examples. However, it should not be construed that these examples restrict this invention as they are given merely by way of illustration.

Example 1

To a 15% n-hexane solution of 1,3-butadiene was added 0.05 part by weight of n-butyllithium per 100 parts by weight of 1,3-butadiene as a catalyst and the polymerization reaction was carried out at 90° C. for 3 hours. A portion of the resulting solution of a polybutadiene rubber was taken out to measure a Mooney viscosity thereof by preheating the sample at 100° C. for one minute in a large-size rotor and rotating for 4 minutes and the Mooney viscosity turned out to be 45.

To the resulting polymer solution thus obtained were subsequently added 1,3-butadiene, styrene, n-butyllithium as a catalyst and potassium acetone as a random copolymerization agent as specified in the following Table 1 and the copolymerization was carried out.

The amount of the random copolymerization agent added was such that the respective reaction velocities of 1,3-butadiene and styrene were made equal.

After the copolymerization reaction was completed, there was added 0.5 part by weight of 2,6-di-tertiary-butyl-p-cresol per 100 parts by weight of the polymer blend as an antioxidant and hexane was removed from the reaction mixture to obtain a polymer blend (A), of which fundamental physical properties are shown in the following Table 1.

TABLE 1

| | |
|---|---|
| Active polybutadiene rubber __parts by weight__ | 100 |
| 1,3-butadiene __________________________do____ | 15 |
| Styrene ________________________________do____ | 85 |
| Potassium acetone ______________________do____ | 0.021 |
| n-Butyllithium ________________________do____ | 0.07 |
| n-Hexane [1] __________________________do____ | 1133 |
| Bound styrene [2] (percent) ______________ | 42.5 |
| Block styrene [3] (percent) ______________ | 9.5 |
| Mooney viscosity of the polymer blend ($ML_{1+4}$, 100° C.) | 45 |

Bonding pattern of butadiene in the polymer blend: [4]

| | |
|---|---|
| Cis 1,4-linkage (percent) __________________ | 38.5 |
| Trans 1,4-linkage (percent) ________________ | 49.5 |
| 1,2-linkage (percent) ______________________ | 12.0 |

[1] Including the n-hexane first added.
[2] The amount of bound styrene in the polymer blend in terms of percent by weight as measured according to a Refractive Index method.
[3] The amount of block styrene was determined as follows: Into 100 parts by weight of carbon tetrachloride were dissolved 2 parts by weight of the resulting polymer blend and there were added 10 parts by weight of di-tert-butyl-hydroperoxide and subsequently 0.02 part by weight of osmium tetraoxide, then, the resulting mixture was heated at 80° C. for 15 minutes to destroy completely the double bonds being present in the molecules of the styrene-butadiene copolymer rubber.
To the solution thus obtained was added a large amount of methanol to afford the block styrene as precipitates which were then filtered out, dried in vacuo and weighed to calculate the amount of the block styrene in terms of percent by weight based on the weight of the polymer blend.
[4] Calculated according to Hampton method from an IR spectra of a $CS_2$ solution of the polymer blend.

For comparison, a random copolymer (B) of 1,3-butadiene and styrene in a weight ratio of 15:85 was obtained in n-hexane using n-butyllithium and potassium acetone as a catalyst and an additive.

The polymerization reaction conditions and the fundamental physical properties of the resulting copolymer are shown in the following Table 2. In the instant copolymer, 0.5 part by weight of 2,6-di-tert-butyl-p-cresol per 100 parts by weight of the copolymer was used as an antioxidant.

TABLE 2

| | |
|---|---|
| 1,3-butadiene ________________parts by weight__ | 15 |
| Styrene ______________________________do____ | 85 |
| Potassium acetone ____________________do____ | 0.021 |
| n-Butyllithium ______________________do____ | 0.07 |
| n-Hexane ____________________________do____ | 567 |
| Polymerization temperature ______________° C__ | 70 |
| Polymerization time ____________________hrs__ | 4 |

TABLE 2—Continued

| | |
|---|---|
| Bound styrene (percent) [1] | 84.5 |
| Block styrene (percent) [1] | 19.8 |
| Mooney viscosity ($ML_{1+4}$, 100° C.) | 45.0 |
| Bonding pattern of 1,3-butadiene: | |
|   Cis 1,4-linkage (percent) | 39.5 |
|   Trans 1,4-linkage (percent) | 50.0 |
|   1,2-linkage (percent) | 11.5 |

[1] The measuring conditions were the same as in Table 1.

For further comparison, a 15% n-hexane solution of 1,3-butadiene was polymerized in n-hexane using 0.05 part by weight of n-butyllithium per 100 parts by weight of 1,3-butadiene at 90° C. for 3 hours to obtain a polybutadiene (C) having a Mooney viscosity of 45. In the instant polymer, 0.5 part by weight of 2,6-di-tert-butyl-p-cresol was incorporated as an antioxidant.

A polymer blend obtained by mixing the styrene-butadiene copolymer rubber (B) and the polybutadiene rubber (C) in a weight ratio of 1:1 had the same properties as those of the polymer blend (A) of this invention with regard to the amount of bound styrene, Mooney viscosity and bonding pattern of butadiene.

The polymer blend (A), styrene-butadiene copolymer rubber (B) and the polybutadiene rubber (C) thus obtained were mixed on a 8″ open mill in recipes shown in Table 3 at a temperature ranging 60–70° C.

TABLE 3

| Ingredients [1] | Example polymer blend (A) | Comparative example polymer blend |
|---|---|---|
| Polymer blend (A) | 100 | |
| Copolymer rubber (B) | | 50 |
| Polybutadiene rubber (C) | | 50 |
| Zinc oxide | 5 | 5 |
| Stearic acid | 2 | 2 |
| Ionol [2] | 1 | 1 |
| Naphthenic process oil [3] | 5 | 5 |
| Calcium carbonate | 50 | 50 |

[1] Parts by weight.
[2] 2,6-di-tert-butyl-p-cresol.
[3] Process oil having a specific gravity of 0.8850 and a V.G.C. of 0.8750.

The observation on the compatibilities of these sample polymer blends revealed that in the compound of example polymer blend (A) the mixing of the filler, process oil, etc. was effected quite smoothly so that it took only 15 minutes to accomplish the uniform mixing.

In contrast, in the compound of Comparative Example polymer blend, the mixing of the copolymer rubber (B) and the polybutadiene rubber (C) was not effected sufficiently and, in addition, the mixing of the filler, process oil, etc., was not carried out smoothly so that it took 40 minutes to accomplish a thorough mixing of these compounding ingredients.

The fact mentioned above clearly substantiates the excellent roll-mill processability of the polymer blend (A) obtained according to this invention.

The polymer blend (A) of this invention, styrene-butadiene copolymer rubber (B) and the polybutadiene rubber (C) were then compounded, respectively, according to recipes shown in Table 4 using a B-type Banbury mixer this time.

The mixing conditions were such that the compounding ingredients except for the vulcanization accelerator CZ and sulfur, were incorporated in a sequence as follows; first the stearic acid, zinc oxide, and antioxidant D were added at a mixing temperature of 120° C. after a lapse of 30 seconds from the throwing of the polymer into a hopper, then, after mixing for 15 minutes, second the carbon black and process oil were added and the mixing was further carried out for additional 5 minutes. Last, after maturing the mixture for 24 hours, the vulcanization accelerator and sulfur were mixed at 105° C. for 2 minutes.

TABLE 4

| Ingredients [1] | Compound of— | |
|---|---|---|
| | Example polymer blend (A) | Comparative example polymer blend |
| Polymer blend (A) | 100 | |
| Styrene-butadiene copolymer rubber (B) | | 50 |
| Polybutadiene rubber (C) | | 50 |
| HAF carbon black | 50 | 50 |
| Aromatic process oil [2] | 10 | 10 |
| Stearic acid | 1.0 | 1.0 |
| Zinc oxide | 3.0 | 3.0 |
| Antioxidant D [3] | 1.0 | 1.0 |
| Vulcanization accelerator CZ [4] | 1.0 | 1.0 |
| Sulfur | 1.8 | 1.8 |

[1] Parts by weight.
[2] Process oil having a V.G.C. of 0.9238 and a specific viscosity of 0.9857.
[3] Trade name of phenyl-β-naphthylamine.
[4] Trade name of n-cyclohexylbenzothiazyl sulphenamide.

In the compounding of the polymer blend (A) of this invention, the time required for mixing the compounding ingredients uniformly, i.e. the time lapsed until the mixing torque reached the maximum value after the incorporation of carbon black, was 2 minutes and 30 seconds, while the compounding of Comparative Example polymer blend required 4 minutes.

From the above, it can be understood that the polymer blend (A) of this invention has an excellent compatibility with compounding ingredients.

These two compounded rubber stocks were press-vulcanized at 141° C. for 30 minutes, respectively, to give vulcanized rubbers and their physical properties were measured. The results are tabulated in the following Table 5:

TABLE 5

| Item | Compound of— | |
|---|---|---|
| | Example polymer blend (A) | Comparative example polymer blend |
| Tensile strength (kg./cm.$^2$) [1] | 240 | 202 |
| 300% tensile modulus (kg./cm.$^2$) [1] | 90 | 82 |
| Elongation (percent) [1] | 620 | 506 |
| Tear resistance (kg./cm.) [1][2] | 41 | 35 |
| Hardness [3] | 75 | 70 |
| Resilience [4] | 46 | 40 |
| Brittle temperature [5] | −60 | −55 |
| Abrasion index [6] | 130 | 100 |

[1] Measured according to ASTM D412-61T.
[2] Measured according to ASTM D624-54. Sample shape C-type.
[3] Measured according to ASTM D76-59T.
[4] Measured by using a Dunlop tripsometer.
[5] Measured by using a Gehman tortion tester.
[6] Measured by using an Akron abrasion tester with a dead load of 2 kg. and a slipping angle of 75°. The abrasion resistance of the comparative compound was indexed as 100.

As is clear from the Table 5, the vulcanized rubber product obtained from the compound of the polymer blend (A) of this invention is superior in practically all physical properties, particularly the dynamic property, low temperature characteristics, abrasion resistance and resilience, over the vulcanized rubber product obtained from the componding of the mechanically-mixed polymer blend of the Comparative Example.

Example 2

Generally speaking, in the presence of a lithium based catalyst, the reaction velocity of 1,3-butadiene is faster than that of styrene. Hence, in producing a random copolymer from a monomeric mixture of styrene and butadiene, first a monomeric mixture having a higher styrene content is subjected to a polymerization reaction. For example, when polymerizing a monomeric mixture consisting of 15.0 parts by weight of 1,3-butadiene and 85.0 parts by weight of styrene in toluene using n-butyllithium, the proportion of 1,3-butadiene to styrene polymerized in the initial stage of the reaction is 77:23 in a weight ratio. Thus, if 1,3-butadiene is supplemented continuously to the polymerization solution to maintain the composition ratio of 1,3-butadiene to styrene in the resulting copolymer rubber at the ratio set forth above, there may be obtained a random copolymer having a uniform styrene content from the initial stage of the polymerization reaction to the terminating stage.

In accordance with the method mentioned above, there was copolymerized a monomeric mixture while maintaining the composition ratio of 1,3-butadiene to styrene at 15:85 parts by weight using 0.070 part by weight of n-butyllithium per 100 parts by weight of the total monomers at 70° C. for 6 hours.

A portion of the resulting copolymer solution was taken out and, after removing toluene therefrom, the styrene content was determined as 23.5% by weight according to Refractive Index method.

To the resulting copolymer solution in toluene were added 1,3-butadiene, styrene and tetrahydrofuran as a random polymerization agent and the copolymerization reaction was carried out under conditions shown in the following Table 6. The fundamental physical properties of the resulting polymer blend (A) are also tabulated in the Table 6.

The toluene solution of the polymer blend was poured into methanol to precipitate the product polymer which was dried in vacuo after incorporating 0.5 part by weight of 2,6-di-tert-butyl-p-cresol as an antioxidant thereinto.

TABLE 6

| | |
|---|---|
| Active styrene-butadiene random copolymer rubber containing 23.5% by weight of bound styrene ______________________ parts by weight__ | 68.6 |
| 1,3-butadiene ______________________________ do______ | 85.0 |
| Styrene ____________________________________ do______ | 15.0 |
| Tetrahydrofuran ____________________________ do______ | 0.210 |
| n-Butyllithium _____________________________ do______ | 0.07 |
| Toluene [1] ________________________________ do______ | 96.0 |
| Amount of bound styrene contained in the polymer blend [2] (percent) __________________________ | 60.5 |
| Amount of block styrene [2] (percent) ___________ | 15.5 |
| Mooney viscosity of the polymer blend ($ML_{1+4}$, 100° C.)[2] _______________________________ | 45 |
| Bonding pattern of butadiene in the polymer blend: | |
|     Cis 1,4-linkage (percent) ___________________ | 30.0 |
|     Trans 1,4-linkage (percent) _________________ | 50.5 |
|     1,2-linkage (percent) ______________________ | 19.5 |

[1] Including toluene first added.
[2] Measuring conditions are the same as in Table 2.

For comparison, a solution of a random copolymer rubber having a bound styrene content of 23.5% and a solution of the same copolymer as above except that the content of the bound styrene was 85.0% were prepared, respectively, according to the same procedures as described above, and the resulting toluene solutions of these respective copolymers were mixed together in such a proportion that the amount of the random copolymer having a content of the bound styrene of 85.0% was 100 parts by weight per 68.6 parts by weight of the random copolymer having a content of the bound styrene of 23.5%, then, after a thorough agitation to give a uniform mixture, the mixture was poured into methanol to precipitate a polymer into which 0.5 part by weight of 2,6-di-tert-butyl-p-cresol per 100 parts by weight of the polymer blend was incorporated and dried to yield a Comparative example polymer blend (B). The fundamental physical properties of the resulting Comparative Example polymer blend (B) are shown in the following Table 7.

TABLE 7

| | |
|---|---|
| Mooney viscosity ($ML_{1+4}$, 100° C.) ____________ | 46.0 |
| Amount of bound styrene (percent) _____________ | 60.5 |
| Bonding pattern of butadiene: | |
|     Cis-1,4 linkage (percent) ___________________ | 32.0 |
|     Trans-1,4 linkage (percent) _________________ | 50.5 |
|     1,2-linkage (percent) ______________________ | 17.5 |

The measuring conditions are the same as in Table 2.

The resulting polymer blend (A) of this invention, the Comparative Example polymer blend (B) which was obtained by mixing polymers in the form of a solution as above, and another Comparative Example polymer blend (C) having a styrene content of 60.0% which was obtained by mixing an emulsion-polymerized styrene-butadiene copolymer rubber having a content of bound styrene of 85.0% with a styrene-butadiene copolymer rubber having a content of bound styrene of 23.5% in the form of a latex, were milled on an open mill at 75° C. according to a recipe as shown in Table 8.

TABLE 8

| | Parts by weight |
|---|---|
| Polymer blend _______________________________ | 100 |
| Zinc oxide __________________________________ | 5 |
| Hakuenka O [1] _____________________________ | 20 |
| Nipsil VN—3 [2] ____________________________ | 15 |
| Clay _______________________________________ | 20 |
| Stearic acid ________________________________ | 2 |
| Ionol _______________________________________ | 1 |
| Naphthenic process oil [3] ____________________ | 6 |
| Polyethylene glycol __________________________ | 2 |
| Vulcanization accelerator DM [4] _______________ | 1.5 |
| Vulcanization accelerator D [5] _________________ | 0.5 |
| Sulfur ______________________________________ | 1.7 |

[1] Resin acid activated calcium carbonate.
[2] Pulverized silicic acid hydrate.
[3] Process oil having a V.G.C. of 0.8500 and a specific viscosity of 0.8857.
[4] Dibenzothiazyldisulfide.
[5] Diphenylguanidine.

The observation on the compatibilities of these three polymer blends thus milled on the open mill revealed that the times required for mixing the whole compounding ingredients were as shown in the following Table 9.

TABLE 9

| | Min. |
|---|---|
| Compound of example polymer blend (A) _________ | 25 |
| Compound of comparative example polymer blend (B) ______________________________________ | 30 |
| Compound of comparative example polymer blend (C) ______________________________________ | 45 |

As is clear from the above table, the polymer blend of this invention shows a remarkably excellent compatibility when mixing compounding ingredients therewith as compared with the comparative emulsion-polymerized polymer blend (C).

These three compounded rubber stocks thus obtained were vulcanized at 140° C. for 60 minutes, respectively, and there obtained vulcanized rubber products having physical properties as shown in the following Table 10.

TABLE 10

| | Compound of— | | |
|---|---|---|---|
| | Example polymer blend (A) | Comparative example polymer blend (B) | Comparative example polymer blend (C) |
| Tensile strength (kg./cm.²)___ | 230 | 205 | 215 |
| 300% tensile modulus (kg./cm.²)_______________ | 65 | 60 | 60 |
| Elongation (percent)_________ | 700 | 690 | 680 |
| Tear resistance (kg./cm.)_____ | 53 | 45 | 45 |
| Hardness___________________ | 95 | 95 | 95 |
| Resilience (percent)_________ | 48 | 42 | 35 |
| Abrasion index [1]___________ | 125 | 100 | 75 |
| Brittle temperature (° C.)____ | −30 | −30 | −10 |

[1] The abrasion resistance of the compound of comparative example polymer blend (B) was indexed as 100.
Note.—Other measuring conditions are the same as in Table 5.

As can be clearly noted from the Table 10, the polymer blend (A) of this invention is capable of affording a vulcanized rubber product superior in practically all physical properties, particularly, resilience and abrasion resistance, as compared with the comparative polymer blend (B) which was obtained by mixing solutions, notwithstanding the fact that the polymer blend (A) of the present invention has the same hardness as that of the comparative polymer blend (B) or (C).

It is particularly noteworthy that the compound of the polymer blend (A) is remarkably superior in the low temperature characteristic which is an important factor in evaluating a compound of high styrene-containing copolymer rubber, as well as in the abrasion resistance and dynamic property, over the compound of emulsion-polymerized polymer blend (C) of the comparative example.

These three copolymer rubber compounds thus obtained were then heat-moulded at 140° C. for 60 minutes in a shoe-sole mould, respectively, and the resulting vulcanized rubber shoe soles were attached to shoes which were actually worn to evaluate the abrasion resistances. The results are shown in the following Table 11.

TABLE 11

| | Abrasion index [1] |
|---|---|
| Compound of example polymer blend (A) | 135 |
| Compound of comparative example polymer blend (B) | 100 |
| Compound of comparative example polymer blend (C) | 90 |

[1] Actually-worn abrasion resistance of the compound of Comparative Example polymer blend (B) was indexed as 100.

As is clear from the table, the actually-worn abrasion resistance of the compound of example polymer blend (A) of this invention is outstanding superior over those of compounds of comparative example polymer blends (B) and (C).

Example 3

From a high-cis polybutadiene containing 96.5% cis-1,4 linkage, 2.0% trans-1,4 linkage and 1.5% 1,2 linkage, and having a Mooney viscosity of 55, which was obtained by polymerization using cobalt chloride-pyridine complex and diethylaluminium chloride, was removed an antioxidant contained therein using isopropanol and the polymer was immediately dissolved in n-hexane to give a 5% n-hexane solution.

After oxygen was substantially removed from the solution mentioned above by purging with nitrogen, there were added 60 parts by weight of 1,3-butadiene, 140 parts by weight of styrene, 0.035 part by weight of potassium acetone and 0.18 part by weight of sec-butyllithium per 100 parts by weight of polybutadiene and the copolymerization was carried out at 90° C. for 3 hours under nitrogen atmosphere. To the resulting copolymer was added 0.5 part by weight of 2,6-di-tert-butyl-p-cresol per 100 parts by weight of the polymer blend and hexane was removed therefrom to give a polymer blend (A).

The polymer blend (A) thus obtained had a Mooney viscosity of 48.0, a styrene content of 47% and a block styrene content of 5.0%.

For comparison, to a 15% by weight hexane solution of a monomeric mixture of 1,3-butadiene and styrene in a ratio of 30:70, were added 0.08 part by weight of sec-butyllithium and 0.0175 part by weight of potassium acetone per 100 parts by weight of the monomeric mixture and the copolymerization was carried out at 90° C. for 3 hours under nitrogen atmosphere. To the resulting styrene-butadiene copolymer was added 2,6-di-tert-butyl-p-cresol and there was obtained a copolymer.

With the copolymer thus obtained was mixed the same high-cis polybutadiene as used in the polymer blend (A) obtained above in a weight ratio of 1:2 on an open-roll and there was obtained a comparative example polymer blend (B) having a Mooney viscosity of 47.0, a bound styrene content of 47.0% and a block styrene content of 53%.

These two polymer blends (A) and (B) thus obtained were milled on an open roll, respectively, according to a recipe shown in Table 12.

TABLE 12

| | Parts by weight |
|---|---|
| Polymer blend | 90 |
| Natural rubber RSS #3 | 10 |
| Sulfur | 2.5 |
| Vulcanization accelerator DM | 1.2 |
| Zinc oxide | 5 |
| Stearic acid | 2 |
| DPT [1] | 4 |
| Urea blowing agent [2] | 5 |
| Coumarone resin | 5 |
| Naphthenic process oil [3] | 10 |
| Hard clay | 30 |
| Calmos [4] | 40 |
| Hakuenka O | 30 |
| Light calcium carbonate | 30 |

[1] Dinitrosopentamethylene tetramine.
[2] Urea and derivatives thereof. Trade name "Selton A."
[3] Process oil having a V.G.C. of 0.876 and a specific viscosity of 0.9085.
[4] Calcium carbonate treated with lignin.

The resulting compounds thus milled were vulcanized, respectively, according to the procedures as described in the following to obtain sponge foams:

The milled compound was put into a mould measuring 140 x 70 x 12 (mm.) and a primary vulcanization was carried out at 135° C. for 11 minutes, then, after the primary vulcanized product was transferred to another mould measuring 224 x 112 x 26 (mm.), a secondary vulcanization was effected at 155° C. for 11 minutes. Although the blowing operation was completed by the secondary vulcanization, under such a condition, there still remained pressures within the formed bubbles so that, if the product was taken out into open air as such, the foamed product would shrink as the internal pressures escaped into open air. Hence, in order to minimize the shrinkage, the secondarily vulcanized product was put into a thermostat maintained at 80° C. in an open condition for 22 hours to relax the residual strain. This last operation is called "tertiary vulcanization."

The physical properties of the sponge foams thus obtained are tabulated in the following Table 13.

TABLE 13

| | Compound of— | |
|---|---|---|
| | Example polymer blend (A) | Comparative example polymer blend (B) |
| Mooney viscosity (ML$_{1+4}$, 100° C.) | 33 | 30 |
| Mooney scorch | 15 | 15 |
| Volume ratio in foaming: | | |
|   Primary vulcanization | 2.2 | 2.1 |
|   Secondary vulcanization | 5.9 | 5.7 |
| Hardness (Ascar C-type) | 64 | 62 |
| Tensile strength (kg./cm.$^2$) | 26 | 19 |
| Elongation (percent) | 175 | 160 |
| Resilience (percent) | 48 | 43 |
| Compression set (percent)[1] | 25 | 28 |
| Compulsory shrinkage (percent)[2] | 2.3 | 2.7 |
| Specific gravity | 0.20 | 0.20 |

[1] Measured according to JIS K-6301.
[2] Percentage of shrinkage during the tertiary vulcanization.

NOTE.—Other measuring conditions were the same as in Table 5.

As can be noted clearly from the Table 13, it is shown that the polymer blend of this invention is an excellent rubber material for the production of sponge foamed products since it is capable of affording a foamed product exhibiting superiorities in practically all physical properties, particularly the tensile strength, elongation, resilience and compulsory shrinkage, as compared with the mechanically mixed polymer blend (B) of the Comparative Example.

Next, there were obtained sponge foamed products from these two compounds of the Example and Comparative Example according to the same recipe as shown in the Table 12 and the abrasion resistances were evaluated by making shoe soles therefrom which were actually worn, respectively. The results are shown in the following Table 14.

TABLE 14

Abrasion index [1]
Compound of example polymer blend (A) ________ 130
Compound of Comparative Example polymer blend (B) ______________________________________ 100

[1] The degree of wear was measured after the test shoes were actually worn for five months. The abrasion resistance of the compound of Comparative Example polymer blend (B) was indexed as 100.

As is clear from the above table, the compound of the polymer blend (A) of this invention shows remarkably high abrasion resistance as compared with the compound of Comparative Example polymer blend (B).

Example 4

To a 15% by weight of n-hexane solution containing 100 parts by weight of 1,3-butadiene was added 0.055 part by weight of n-butyllithium per 100 parts by weight of 1,3-butadiene, and the polymerization was carried out at 70° C. for 6 hours under nitrogen atmosphere.

A portion of the resulting polymer solution was taken out and, after removing n-hexane therefrom, the Mooney viscosity of the resulting polybutadiene was measured as 35.0.

To the polymer solution obtained above were added varying amounts of a monomeric mixture in which a ratio of 1,3-butadiene to styrene was maintained at 15:85, hexane, n-butyllithium and potassium acetone as a random copolymerization agent and the copolymerization was effected.

The polymerization conditions, the status of hexane solution of the polymer blend and the fundamental physical properties of the polymer blend are shown in the following Table 15 altogether.

As can be noted from the Table 15, according to the process of this invention, the hexane solution of the polymer blend forms a uniform slurry and there is observed no phase separation therein so that no difficulty is encountered in transporting the polymer solution and less power is required therefore since the polymer solution is in the form of a slurry having a low viscosity.

For comparison, a n-hexane solution containing 15 parts by weight of 1,3-butadiene and 85 parts by weight of styrene was copolymerized at 90° C. for 4 hours using the same n-butyllithium and potassium acetone as above.

To the copolymer solution thus obtained was added the polybutadiene solution used in said example under mixing conditions shown in Table 16 and the status of the mixture solution was observed with results shown in Table 16 as well.

As is clear from the Table 16, it is appreciated that a phase separation inevitably occurs in the polymer blend solutions which were merely mixed in the form of a solution. Moreover, the polymer blends obtained by adding methanol to these polymer blend solutions thus phase separated. Solidifying the precipitates formed followed by complete dry revealed that the solid were considerably nonuniform without exception, enough to suggest the drastically inferior performances thereof as compared with the polymer blends of this invention.

TABLE 15

|  | A | B | C | D | E |
| --- | --- | --- | --- | --- | --- |
| Active polybutadiene | 100 | 100 | 100 | 100 | 100 |
| 1,3-butadiene | 5.0 | 9.9 | 18.3 | 45.0 | 85 |
| Styrene | 28.3 | 56.1 | 103.7 | 255.0 | 482 |
| Potassium acetone | 0.007 | 0.014 | 0.026 | 0.063 | 0.120 |
| n-Butyllithium | 0.023 | 0.046 | 0.085 | 0.210 | 0.397 |
| Hexane [1] | 753 | 934 | 1,258 | 2,270 | 3,783 |
| Polymerization temperature (° C.) | 90 | 90 | 90 | 90 | 90 |
| Polymrization time (hrs.) | 4 | 4 | 4 | 4 | 4 |
| Content of styrenebutadiene copolymer in the polymer blend (percent) | 25 | 40 | 55 | 75 | 85 |
| Content of bound styrene in the polymer blend (percent) | 21.2 | 35.0 | 46.8 | 64.0 | 72.4 |
| Status of the solution | (2) | (2) | (2) | (2) | (3) |

[1] Including hexane originally present.
[2] Slurry, no phase separation.
[3] Phase separated.

TABLE 16

|  | F | G | H | I |
| --- | --- | --- | --- | --- |
| Polybutadiene | 100 | 100 | 100 | 100 |
| Styrene-butadiene copolymer | 33.3 | 67.0 | 122 | 300 |
| Hexane [1] | 753 | 934 | 1,258 | 2,170 |
| Content of styrenebutadiene copolymer in the polymer blend (percent) | 25 | 40 | 55 | 95 |
| Content of bound styrene in the polymer blend (percent) | 21.2 | 35.0 | 46.8 | 64.0 |
| Status of the solution | (2) | (2) | (2) | (2) |

[1] Total sum of hexane contained in the polybutadiene solution and copolymer solution.
[2] Phase separated.

Example 5

To a 10% by weight n-hexane solution containing an isoprene monomer was added 0.010 part by weight of n-butyllithium per 100 parts by weight of isoprene and the polymerization reaction was carried out at 50° C. for 10 hours under nitrogen atmosphere.

A portion of the resulting polyisoprene rubber was taken out and the intrinsic viscosity of the resulting polymer was measured as 5.0 in toluene at 25° C. The content of cis-1,4 linkage was determined as 93.0% according to the IR spectrum.

To the polyisoprene rubber solution thus obtained were added 1,3-butadiene, styrene, n-butyllithium and potassium oleate as a random copolymerization agent as specified in the following Table 17 and the copolymerization was carried out at 85° C. for 4 hours.

The amount of potassium oleate thus added was such that the reaction velocities of 1,3-butadiene and styrene were made equal.

The fundamental physical properties of the polymer blend (A) thus obtained are also shown in Table 17 shown below:

TABLE 17

Active polyisoprene rubber ____parts by weight__ 100
1,3-butadiene ______________________________do____ 10.0
Styrene ___________________________________do____ 56.7
Potassium oleate __________________________do____ 0.048
n-Butyllithium ____________________________do____ 0.047
n-Hexane [1] _______________________________ 943
Content of bound styrene in the polymer blend (percent) ______________________________ 34.0
Content of copolymer in the polymer blend (percent) ______________________________ 40

[1] Including the n-hexane added when polymerizing isoprene.

For comparison, a styrene-butadiene random copolymer having a bound styrene content of 85% was obtained by copolymerizing styrene and butadiene in n-hexane using n-butyllithium and potassium oleate.

On the other hand, a polyisoprene having an intrinsic viscosity of 4.8 was obtained according to the same procedures as in example.

These two polymers thus obtained were mixed on an open roll and there was obtained a Comparative Example polymer blend (B).

Next, the resulting two polymer blends (A) and (B) were compoundsd, respectively, according to a recipe shown in Table 18 using a B-type Banbury mixer under the same conditions as described in Example 1.

TABLE 18

| | Parts by weight |
|---|---|
| Polymer blend | 100 |
| HAF carbon black | 50 |
| Aromatic process oil [1] | 10 |
| Stearic acid | 1.0 |
| Zinc oxide | 3.0 |
| Antioxidant D | 1.0 |
| Vulcanization accelerator CZ | 1.0 |
| Sulfur | 2.0 |

[1] Process oil having a V.G.C. of 0.9238 and a specific gravity of 0.9857.

The resulting compounded rubber compositions were heat press-vulcanized at 141° C. for 30 minutes, respectively, to afford vulcanized rubber products having the physical properties as shown in the following Table 19.

TABLE 19

| | Compound of— | |
|---|---|---|
| Item | Example blend (A) | Comparative example blend (B) |
| Tensile strength (kg./cm.$^2$) | 260 | 225 |
| 300% tensile modulus (kg./cm.$^2$) | 73 | 65 |
| Elongation (percent) | 680 | 600 |
| Tear resistance (kg./cm.) | 47 | 42 |
| Hardness | 92 | 90 |
| Resilience (percent) | 55 | 45 |
| Abrasion index [1] | 135 | 100 |

[1] Abrasion resistance of the compound of comparative example polymer blend (B) was indexed as 100.

NOTE.—Other measuring conditions were the same as in Table 5.

As is clear from the above table, the physical properties of the vulcanized rubber product obtained from the compound of the polymer blend (A) of this invention are superior in all respects over those of the vulcanized rubber product obtained from the compound of Comparative Example polymer blend (B) which was obtained by a mere mechanical mixing.

We claim:

1. A process for producing a polymer blend comprising (A) 25–95 parts by weight of a conjugated diolefin homopolymer, and (B) 75–5 parts by weight of a random copolymer of a conjugated diolefin and a monovinyl-substituted aromatic compound having a content of the monovinyl-substituted aromatic compound of 50–95% by weight, comprising
    (a) polymerizing a conjugated diolefin monomer in an inert hydrocarbon medium in the presence of a lithium based catalyst to form a solution containing a conjugated diolefin homopolymer,
    (b) copolymerizing a conjugated diolefin and a monovinyl-substituted aromatic compound in the presence of additional lithium based catalyst, said lithium based catalyst being present in an amount sufficient to effect copolymerization, and said solution formed in (a) to form said polymer blend of said homopolymer and said random copolymer.

2. A process according to claim 1 wherein said inert medium is an aliphatic hydrocarbon.

3. A process according to claim 1, wherein said conjugated diolefin homopolymer is a member selected from the group consisting of a polybutadiene rubber having a relatively low cis-1,4 linkage and a high-cis polyisoprene rubber.

4. A rubber composition comprising 100 parts by weight of the polymer blend made by the process of claim 1, 10–400 parts by weight of a filler and 2–100 parts by weight of a process oil.

5. A process according to claim 1, wherein said random copolymer is formed by copolymerizing said conjugated diolefin and said monovinyl-substituted aromatic compound with a ratio of the reaction velocity $K_D$ of said conjugated diolefin to the reaction velocity $K_A$ of said monovinyl-substituted aromatic compound being from 0.2 to 5.

6. A process for producing a polymer blend comprising (A) 25–95 parts by weight of a random copolymer of a conjugated diolefin and a monovinyl-substituted aromatic compound having a content of the monovinyl-substituted aromatic compound of not more than 40% by weight, and (B) 75–5 parts by weight of a random copolymer of a conjugated diolefin and a monovinyl-substituted aromatic compound having a content of the monovinyl-substituted aromatic compound of 50–95% by weight, comprising
    (a) copolymerizing a monomeric mixture of a conjugated diolefin and a monovinyl-substituted aromatic compound in an inert hydrocarbon medium in the presence of a lithium based catalyst to form a random copolymer of said conjugated diolefin and said monovinyl-substituted aromatic compound having a content of the monovinyl-substituted aromatic compound of not more than 40% by weight, and
    (b) copolymerizing a conjugated diolefin and a monovinyl-substituted aromatic compound in the presence of additional lithium based catalyst, said lithium based catalyst being present in an amount sufficient to effect further copolymerization, and said random copolymer formed in (a) to form said polymer blend of said copolymer formed in (a) and said copolymer defined in (B) above.

7. A process according to claim 6, wherein said inert medium is an aliphatic hydrocarbon.

8. A process according to claim 6, wherein said random copolymer formed in (a) is a styrene-butadiene random copolymer.

9. A process according to claim 6, wherein said random copolymer formed in (b) and defined in (B) is formed by copolymerizing said conjugated diolefin and said monovinyl-substituted aromatic compound with a ratio of the reaction velocity $K_D$ of said conjugated diolefin to the reaction velocity $K_A$ of said monovinyl-substituted aromatic compound being from 0.2 to 5.

10. A rubber composition comprising 100 parts by weight of the polymer blend made by the process of claim 6, 10–400 parts by weight of a filler and 2–100 parts by weight of a process oil.

References Cited

UNITED STATES PATENTS

| 3,402,160 | 9/1968 | Hayes | 260—880 R |
| 3,449,306 | 6/1969 | Zelinski | 260—880 B |
| 2,638,457 | 5/1953 | Gates | 260—17 BU |
| 2,638,462 | 5/1953 | Borders | 260—892 |
| 2,900,357 | 8/1959 | Ayers et al. | 260—33.6 AO |
| 3,439,049 | 4/1969 | Trepka | 252—431 |
| 3,458,602 | 7/1969 | Pollock | 260—880 |

ALLAN LIEBERMAN, Primary Examiner

U.S. Cl. X.R.

260—41.5 R, 83.7, 94.2 M, 876 B, 880 R, 880 B, 887